United States Patent
Li et al.

(10) Patent No.: US 10,375,579 B2
(45) Date of Patent: Aug. 6, 2019

(54) CHANNEL DETECTION METHOD AND SYSTEM, DEVICE, AND TERMINAL HAVING BASE STATION FUNCTIONS

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yi-Xue Lei, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 60 days.

(21) Appl. No.: 15/444,338

(22) Filed: Feb. 28, 2017

(65) Prior Publication Data
US 2017/0171759 A1 Jun. 15, 2017

Related U.S. Application Data

(63) Continuation-in-part of application No. PCT/CN2014/096024, filed on Dec. 31, 2014.

(30) Foreign Application Priority Data

Nov. 28, 2014 (CN) .......................... 2014 1 0719732

(51) Int. Cl.
*H04W 16/14* (2009.01)
*H04W 74/00* (2009.01)
(Continued)

(52) U.S. Cl.
CPC .......... *H04W 16/14* (2013.01); *H04B 17/309* (2015.01); *H04L 5/0042* (2013.01);
(Continued)

(58) Field of Classification Search
CPC ..................................................... H04W 16/14
See application file for complete search history.

(56) References Cited

U.S. PATENT DOCUMENTS

2014/0378157 A1* 12/2014 Wei ........................ H04W 16/14
455/454
2017/0085326 A1* 3/2017 Li ........................ H04B 17/345
(Continued)

FOREIGN PATENT DOCUMENTS

EP 2696530 A2 2/2014
WO 2013143053 A1 10/2013

OTHER PUBLICATIONS

Samsung,Discussion on carrier selection for LAA,3GPP TSG RAN WG1 #79,2014.11.17,R1-144740,San Francisco, USA.

*Primary Examiner* — Jason E Mattis
(74) *Attorney, Agent, or Firm* — ScienBiziP, P.C.

(57) ABSTRACT

A channel detection method and system of an LTE system in an unlicensed frequency range, a device having base station functions, and a terminal are provided. The method includes: dividing an unlicensed frequency range into several frequency bands; setting a determination threshold value corresponding to each frequency band for detecting busy/idle states of channels in each frequency band; setting channel monitoring subframes for detecting the downlink channel state and/or the uplink channel state in each frequency band in the frame structure of the LTE system; detecting the busy/idle states of the downlink channel and/or the uplink channel in each frequency band according to the determination threshold value. The present invention increases a spectrum utilization rate of the unlicensed frequency range, (Continued)

and prevents an LTE system working in the unlicensed frequency range from causing large interference to other systems while ensuring the LTE system works in the unlicensed frequency range normally.

20 Claims, 7 Drawing Sheets

(51) Int. Cl.
    *H04W 74/08* (2009.01)
    *H04L 5/00* (2006.01)
    *H04L 27/00* (2006.01)
    *H04B 17/309* (2015.01)
    *H04W 24/02* (2009.01)
    *H04W 84/04* (2009.01)

(52) U.S. Cl.
    CPC ........ *H04L 5/0044* (2013.01); *H04L 27/0006* (2013.01); *H04W 74/006* (2013.01); *H04W 74/0808* (2013.01); *H04L 5/0091* (2013.01); *H04W 24/02* (2013.01); *H04W 84/042* (2013.01)

(56) References Cited

U.S. PATENT DOCUMENTS

| | | | |
|---|---|---|---|
| 2017/0202007 A1* | 7/2017 | Miao | H04W 72/1268 |
| 2017/0288962 A1* | 10/2017 | Yi | H04L 41/0803 |
| 2017/0332267 A1* | 11/2017 | Kim | H04W 72/1289 |
| 2017/0339721 A1* | 11/2017 | Mukherjee | H04W 16/14 |

\* cited by examiner

CHANNEL DETECTION METHOD AND SYSTEM, DEVICE, AND TERMINAL HAVING BASE STATION FUNCTIONS

CROSS-REFERENCE TO RELATED APPLICATIONS

This application is a continuation-in-part of International Application No. PCT/CN2014/096024, filed on Dec. 31, 2014.

FIELD

The present disclosure relates to communication technique, in particular to a channel detection method of a Long Term Evolution (LTE) system in an unlicensed frequency range, a channel detection system of an LTE system in an unlicensed frequency range, a device having base station functions, and a terminal.

BACKGROUND

As the amount of communication traffic increases, the authorized spectrum of a 3GPP becomes insufficient to provide higher network capacity. In order to further improve the utilization rate of frequency spectrum resources, the 3GPP is discussing that how unlicensed spectrums can be used with the help of the authorized spectrum, such as 2.4 GHz and 5 GHz frequency ranges. The unlicensed spectrums are mainly used in systems such as Wi-Fi, BLUETOOTH, radar, medical care uses, and the like.

In general, access technologies, designed for an authorized frequency range, such as Long Term Evolution (LTE), are not applicable to use in unlicensed frequency ranges. Access technologies, such as LTE, have very high requirements for spectrum efficiency and user experience optimization. However, a Carrier Aggregation (CA) function enables the LTE to be deployed in an unlicensed frequency range. The 3GPP provides a concept of LTE Assisted Access (LAA), which can use the unlicensed spectrum with the help of LTE authorized spectrums. The unauthorized frequency spectrum can have two working modes. One working mode is a Supplemental Downlink (SDL), that is, only a downlink transmission subframe is included. The other working mode is a Time Division Duplexing (TDD) mode, that is, both the downlink subframe and an uplink subframe are included. The SDL can only be used by means of CA. However, the TDD mode can be used not only by means of the CA technology, but also by Dual Connectivity (DC), and can also be used independently.

Compared with a Wi-Fi system, the LTE system in the unauthorized frequency range can provide higher spectrum efficiency and larger coverage. Data traffic can be seamlessly switched between the authorized frequency range and the unauthorized frequency range based on the same core network. For users, this means a better broadband experience, a higher speed, a better stability, and more mobility.

Figure 1:
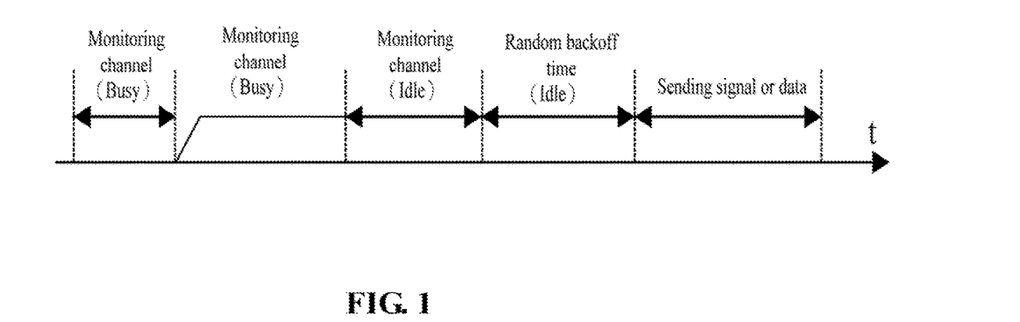
FIG. 1 shows a schematic diagram of interference avoidance rules of a Wi-Fi system.

Existing access technologies on an unlicensed spectrum, such as Wi-Fi, have a weak anti-interference capability. In order to avoid interference, the Wi-Fi system is designed with many interference avoidance rules, such as Carrier Sense Multiple Access/Collision Detection (CSMA/CD) method. The basic principle of the CSMA/CD method is to monitor whether there are other access points (APs) or terminals on the periphery sending/receiving signaling or data before an AP of Wi-Fi or a terminal sends signaling or data. If there are other APs or terminals on the periphery are sending/receiving signaling or data, monitoring is continued until no sending/receiving of the signaling or data. Otherwise, if there are no other APs or terminals on the periphery which are sending/receiving signaling or data, a random number is generated as a waiting time. In the waiting time, if no signaling or data transmission is detected, the AP or the terminal may begin sending signaling or data after the waiting time is completed. The process is shown as in FIG. 1.

However, due to good orthogonality in the LTE network, the interference level can be guaranteed. Therefore, in the base station and the uplink and downlink transmission of the user, there is no need to consider whether or not there are other base stations or other users around, transmitting data. If the LTE is used in an unlicensed frequency range, there is no need to consider whether or not other devices are used in the unlicensed frequency range. In such a situation, Wi-Fi equipment is subject to great interference. As long as there is a service, the Wi-Fi equipment will transmit data. No monitoring rule exists. The idle state of the channel can be detected only after the transmission of the LTE service is completed. After that, data transmission can be carried out.

Therefore, when the LTE network uses the unlicensed frequency range, one of the key points is to ensure that the LAA can coexist with the existing access technologies (such as Wi-Fi) on a fair-friendly basis. However, there is no Listen Before Talk (LBT) mechanism to avoid collisions in the conventional LTE system.

The LBT mechanism, which is similar to the Wi-Fi, can execute detection based on wideband. That is to say, the LBT mechanism determines whether a whole frequency band is available or not by directly detecting a channel state in the whole large frequency band. The defect is that the spectrum utilization not flexible, causing the frequency spectrum utilization rate to be low. Particularly, if the LAA system of an operator A detects that the LBT channel is idle, the unlicensed frequency range is occupied. In fact, the LAA cell may only be occupying part of Resource Block (RB), another RB is not occupied, and yet another RB is in an idle state. When the LAA system of an operator B detects the LBT channel state, the LAA system of the operator B may detect that the channel is busy, due to the fact that the LAA system of operator A is using part of the resources. Thus data cannot be transmitted. In fact, a part of the RB is not being used at all. In this case, the problem of low frequency spectrum utilization rate arises.

Ensuring that the LTE system is prevented from generating large interference to other systems when the LTE system is working normally in the unlicensed frequency range and improving frequency spectrum utilization rate are problematic.

SUMMARY OF THE INVENTION

Based on at least one of the above technical problems, the present disclosure provides a new channel detection scheme of an LTE system in an unlicensed frequency range, to enable the LTE system to divide a wide unlicensed frequency range into a plurality of narrow frequency bands. Thus, a busy/idle state of the channel in each of the narrow frequency bands can be determined individually. Therefore, the frequency spectrum utilization rate is improved. By detecting the busy/idle state of the channel, the LTE system can avoid generating large interference to other systems when the LTE system works normally in the unlicensed frequency range.

According to a first aspect of the present disclosure, a channel detection method of an LTE system in an unlicensed frequency range is provided. The channel detection method is applicable to a device having base station functions and includes: dividing an unlicensed frequency range into a plurality of frequency bands; setting a determination threshold value corresponding to each of the frequency bands, the determination threshold value being used for detecting a busy/idle state of a channel in each of the frequency bands; setting a channel monitoring subframe that is used for detecting a downlink channel state and/or an uplink channel state in each of the frequency bands in a frame structure of the LTE system; and detecting a busy/idle states of the downlink channel and/or the uplink channel in each of the frequency bands according to the determination threshold value.

In the above disclosure, by dividing a wide unlicensed frequency range into multiple frequency bands and setting a determination threshold value corresponding to each of the frequency bands for detecting the busy/idle states of the downlink channel and/or the uplink channel in each of the frequency bands according to the determination threshold value, the wide unlicensed frequency range may be divided into a plurality of narrow bands (i.e., multiple frequency bands), when the LTE system works in the unlicensed frequency range. The busy/idle state of the downlink channel and uplink channel in each narrow band can be determined individually. Thus, the frequency spectrum utilization rate is increased, and low frequency utilization rate, which is caused by only a part of the RB of the unlicensed frequency range being occupied, however, the other systems still detects that the channel is too busy to transmit data, can be avoided.

The busy/idle states of the uplink channel and/or the downlink channel can be detected by setting a channel monitoring subframe. Thus, corresponding interference avoidance mechanisms can be adopted when the LTE system works in the unlicensed frequency range. Thus, the state of the uplink channel and/or the downlink channel can be detected, and the data can be transmitted when the channel is idle (that is, the downlink data can be transmitted when the downlink channel is detected to be idle, and a terminal is informed to transmit the uplink data, when the uplink channel is detected to be idle). When the channel is detected to be busy, the data is not transmitted (that is, the downlink data is not transmitted, when the downlink channel is detected to be busy, and the terminal is notified that the uplink data is not transmitted when the uplink channel is detected to be busy). Thus, the LTE system in an unlicensed frequency range can coexist with the other systems (such as a Wi-Fi system) working in the unlicensed frequency range. The LTE system is prevented from generating large interference to other systems having interference avoidance mechanism, since the LTE system has no interference avoidance mechanism when the LTE system works in the unlicensed frequency range.

The channel monitoring subframe can detect the states of the downlink channel and/or the uplink channel in two ways, first, by periodic detecting, and second, by detecting only when the downlink data and/or uplink data need to be transmitted. In one embodiment, the second way is as follows. When the downlink data and/or uplink data need to be transmitted, the states of the downlink channel and/or the uplink channel are detected. If the channel is detected to be busy, taking a random value N, and continuously detecting and then taking N=N−1 if the channel is detected to be idle. Otherwise, N is unchanged; and the data is sent until N is reduced to zero.

In addition, the downlink data includes common interactive data and control signaling. Those skilled in the art will understand that the device having base station functions in the present disclosure can include a macro base station, and a micro-cell base station realized by communication device (such as an intelligent mobile phone and the like), and so on.

In the above disclosure, preferably, the determination threshold value corresponding to each of the frequency bands is set according to a bandwidth of each of the frequency bands and/or a signal type required to be transmitted by each of the frequency bands.

Specifically, for a frequency band that transmits important signal types, such as the frequency band used for transmitting a synchronization signal, to prevent other systems from occupying such frequency band, the determination threshold may be set lower. Other systems can then detect more easily that the channels in such frequency bands are busy. For a wide bandwidth frequency band, a larger determination threshold value can be selected appropriately, and for a narrow frequency band, a smaller determination threshold value can be selected appropriately.

In the above disclosure, preferably, the determination threshold value corresponding to a frequency band used for transmitting a synchronization signal in the plurality of frequency bands is smaller than the determination threshold value corresponding to other frequency bands in the plurality of frequency bands. By setting the determination threshold value corresponding to the frequency band used for transmitting the synchronization signal being smaller than the determination threshold value corresponding to other frequency bands, the other systems can more easily detect that the channels in the frequency bands of transmitting the synchronization signals are busy. Thus, the frequency band used for transmitting the synchronization signal can be avoided being occupied by the other systems, to affect transmitting the synchronization signal of the LTE system.

In the above disclosure, preferably, dividing an unlicensed frequency range into a plurality of frequency bands includes: dividing the unlicensed frequency range into the plurality of frequency bands based on an average, or randomly dividing the unlicensed frequency range into the plurality of frequency bands.

Specifically, for example, for an unlicensed frequency range of 20 MHz for example, four frequency bands of 5 MHz may be divided on an average basis. Otherwise, frequency bands which include 1.4 MHz, 4.3 MHz, and 5 MHz frequencies may be the divisions.

The above disclosure, preferably, further includes: notifying a terminal to measures a channel quality within a specified frequency band of the plurality of frequency bands, and feed back the channel quality within the specified frequency band.

Specifically, when a device having base station functions detects that channels in certain frequency bands are idle, using the channel monitoring subframe, the terminal can be notified to detect and report channel quality information of the idle channels in the frequency bands. An appropriate channel to transmit downlink data is then selected according to the channel quality information reported by the terminal.

In the above disclosure, preferably, detection times and/or a detection period of the channel monitoring subframe used for detecting busy/idle states of the downlink channel and/or the uplink channel in any one of the frequency bands can be the same as or different from the detection times and/or the detection period of the channel monitoring subframe used for detecting busy/idle states of the downlink channel and/or the uplink channel in other frequency bands.

The above disclosure, preferably, further includes: notifying the terminal of a bandwidth of the unlicensed frequency range, a bandwidth of each of the frequency bands, and the determination threshold value corresponding to each of the frequency bands. Thereby, the terminal can detect a busy/idle state of an uplink channel in each of the frequency bands according to the determination threshold value corresponding to each of the frequency bands.

According to a second aspect of the present disclosure, a channel detection method of an LTE system in an unlicensed frequency range is provided. The channel detection method is applicable to a terminal, and includes: receiving, from a device having base station functions, a bandwidth of an unlicensed frequency range, a bandwidth of each of frequency bands divided by the unlicensed frequency range, and a determination threshold value corresponding to each of the frequency bands, the determination threshold value used for detecting a busy/idle state of a channel in each of the frequency bands; setting a channel monitoring subframe that is used for detecting an uplink channel state in each of the frequency bands in a frame structure of the LTE system, and detecting the busy/idle state of the uplink channel in each of the frequency bands according to the determination threshold value corresponding to each of the frequency bands.

In the above disclosure, the unlicensed frequency range provides high bandwidth. By receiving the bandwidth of the unlicensed frequency range, the bandwidth of each of frequency bands divided by the unlicensed frequency range, and the determination threshold value corresponding to each of the frequency bands sent by the device having base station functions, the LTE terminal can determines respectively a busy/idle state of the uplink channel in a plurality of narrow bands (that is, a plurality of frequency bands) divided by the unlicensed frequency range, when working in the unlicensed frequency range. Thus, the frequency spectrum utilization rate is increased, and low frequency utilization rate, which is caused by only a part of the RB of the unlicensed frequency range is occupied, however, the other systems still detects that the channel is too busy to transmit data, can be avoided.

The busy/idle states of the uplink channel can be detected by setting a channel monitoring subframe. Thus, corresponding interference avoidance mechanisms can be adopted when the LTE system works in an unlicensed frequency range. Thus, the state of the uplink channel can be detected, and uplink data can be transmitted when the channel is idle. When the channel is detected to be busy, the uplink data is not transmitted. Thus, the LTE system in an unlicensed frequency range is enabled to coexist with the other systems (such as a Wi-Fi system) in the unlicensed frequency range. The LTE system is prevented from generating large interference to other systems having the interference avoidance mechanism, due to the LTE system having no interference avoidance mechanism when the LTE system works in the unlicensed frequency range.

Similar to the device having base station functions, the channel monitoring subframe in the terminal can detect the state of the uplink channel in the following two ways. First, periodical detection, and secondly, detection only when the uplink data needs to be transmitted. In one embodiment, the second way is as follows: the state of the uplink channel is detected when the uplink data needs to be transmitted; if the channel is detected to be busy, a random value N is taken, and continuously detected. N=N−1 is taken if the channel is detected to be idle, otherwise, N is unchanged; and the data is sent until N is reduced to zero.

According to a third aspect of the present disclosure, a channel detection system of an LTE system in an unlicensed frequency range is provided. The channel detection system is applicable to a device having base station functions and includes: a division unit, configured to divide an unlicensed frequency range into a plurality of frequency bands; a setting unit, configured to set a determination threshold value corresponding to each of the frequency bands, the determination threshold value being used for detecting a busy/idle state of a channel in each of the frequency bands; a channel detecting unit, configured to set a channel monitoring subframe that is used for detecting a downlink channel state and/or a uplink channel state in each of the frequency bands in a frame structure of the LTE system, and detect a busy/idle state of the downlink channel and/or the uplink channel in each of the frequency bands according to the determination threshold value.

In the above disclosure, by dividing a wide unlicensed frequency range into multiple frequency bands and setting a determination threshold value corresponding to each of the frequency bands for detecting the busy/idle states of the downlink channel and/or the uplink channel in each of the frequency bands according to the determination threshold value, the wide unlicensed frequency range may be divided into a plurality of narrow bands (i.e., multiple frequency bands), when the LTE system works in the unlicensed frequency range. The busy/idle state of the downlink channel and uplink channel in each narrow band can be determined individually. Thus, the frequency spectrum utilization rate is increased, and low frequency utilization rate, which is caused by only a part of the RB of the unlicensed frequency range being occupied, however, the other systems still detects that the channel is too busy to transmit data, can be avoided.

The busy/idle states of the uplink channel and/or the downlink channel can be detected by setting a channel monitoring subframe. Thus, corresponding interference avoidance mechanisms can be adopted when the LTE system works in the unlicensed frequency range. Thus, the state of the uplink channel and/or the downlink channel can be detected, and the data can be transmitted when the channel is idle (that is, the downlink data can be transmitted when the downlink channel is detected to be idle, and a terminal is informed to transmit the uplink data, when the uplink channel is detected to be idle). When the channel is detected to be busy, the data is not transmitted (that is, the downlink data is not transmitted, when the downlink channel is detected to be busy, and the terminal is notified that the uplink data is not transmitted when the uplink channel is detected to be busy). Thus, the LTE system in an unlicensed frequency range can coexist with the other systems (such as a Wi-Fi system) working in the unlicensed frequency range. The LTE system is prevented from generating large interference to other systems having interference avoidance mechanism, since the LTE system has no interference avoidance mechanism when the LTE system works in the unlicensed frequency range.

The channel monitoring subframe can detect the states of the downlink channel and/or the uplink channel in two ways, include, first way, by periodic detecting, and second way, by detecting only when the downlink data and/or uplink data need to be transmitted. In one embodiment, the second way is as follows. When the downlink data and/or uplink data need to be transmitted, the states of the downlink channel and/or the uplink channel are detected. If the channel is detected to be busy, taking a random value N, and continuously detecting and then taking N=N−1 if the channel is detected to be idle. Otherwise, N is unchanged; and the data is sent until N is reduced to zero.

In addition, the downlink data includes common interactive data and control signaling. Those skilled in the art will understand that the device having base station functions in the present disclosure can include a macro base station, and a micro-cell base station realized by communication device (such as an intelligent mobile phone and the like), and so on.

In the above disclosure, preferably, the setting unit is specifically configured to set the determination threshold value corresponding to each of the frequency bands according to a bandwidth of each of the frequency bands and/or a signal type required to be transmitted by each of the frequency bands.

Specifically, for a frequency band that transmits important signal types, such as the frequency band used for transmitting a synchronization signal, to prevent other systems from occupying such frequency band, the determination threshold may be set lower. Other systems can then detect more easily that the channels in such frequency bands are busy. For a wide bandwidth frequency band, a larger determination threshold value can be selected appropriately, and for a narrow frequency band, a smaller determination threshold value can be selected appropriately.

In the above disclosure, preferably, the determination threshold value corresponding to a frequency band used for transmitting a synchronization signal in the plurality of frequency bands is smaller than the determination threshold value corresponding to other frequency bands in the plurality of frequency bands. By setting the determination threshold value corresponding to the frequency band used for transmitting the synchronization signal being smaller than the determination threshold value corresponding to other frequency bands, the other systems can more easily detect that the channels in the frequency bands of transmitting the synchronization signals are busy. Thus, the frequency band used for transmitting the synchronization signal can be avoided being occupied by the other systems, to affect transmitting the synchronization signal of the LTE system.

In the above disclosure, preferably, the dividing unit is specifically configured to: divide the unlicensed frequency ranges into the plurality of frequency bands based on an average; or randomly divide the unlicensed frequency ranges into the plurality of frequency bands.

Specifically, for example, for an unlicensed frequency range of 20 MHz for example, four frequency bands of 5 MHz may be divided on an average basis. Otherwise, frequency bands which include 1.4 MHz, 4.3 MHz, and 5 MHz frequencies may be the divisions.

In the above disclosure, preferably, the system further includes: a first notification unit configured to notify a terminal to measure a channel quality within a specified frequency band of the plurality of frequency bands, and feed back the channel quality within the specified frequency band.

Specifically, when a device having base station functions detects that channels in certain frequency bands are idle, using the channel monitoring subframe, the terminal can be notified to detect and report channel quality information of the idle channels in the frequency bands. An appropriate channel to transmit downlink data is then selected according to the channel quality information reported by the terminal.

In the above disclosure, preferably, detection times and/or a detection period of the channel monitoring subframe used for detecting busy/idle states of the downlink channel and/or the uplink channel in any one of the frequency bands can be the same as or different from the detection times and/or the detection period of the channel monitoring subframe used for detecting busy/idle states of the downlink channel and/or the uplink channel in other frequency bands.

In the above disclosure, preferably, the present disclosure further includes: a second notification unit configured to notify the terminal of a bandwidth of the unlicensed frequency range, a bandwidth of each of the frequency bands, and the determination threshold value corresponding to each of the frequency bands. Thereby, the terminal can detect the busy/idle state of an uplink channel in each of the frequency bands according to the determination threshold value corresponding to each of the frequency bands.

According to a fourth aspect of the disclosure, a device having base station functions is further provided. The device includes the channel detection system of an LTE system in an unlicensed frequency range and applicable to the device having base station functions as mentioned in any of the above disclosures.

According to a fifth aspect of the disclosure, a channel detection system of an LTE system in an unlicensed frequency range is provided. The channel detection system is applicable to a terminal and includes: a receiving unit, configured to receive, from a device having base station functions, a bandwidth of an unlicensed frequency range, a bandwidth of each of frequency bands divided by the unlicensed frequency range, and a determination threshold value corresponding to each of the frequency bands used for detecting a busy/idle state of a channel in each of the plurality of frequency bands; a channel detecting unit, which is configured to set a channel monitoring subframe which is used for detecting an uplink channel state in each of the frequency bands in the frame structure of the LTE system, and detect the busy/idle states of the uplink channel in each of the frequency bands according to the determination threshold value corresponding to each of the frequency bands.

In the above disclosure, the unlicensed frequency range provides high bandwidth. By receiving the bandwidth of the unlicensed frequency range, the bandwidth of each of frequency bands divided by the unlicensed frequency range, and the determination threshold value corresponding to each of the frequency bands sent by the device having base station functions, the LTE terminal can determines respectively a busy/idle state of the uplink channel in a plurality of narrow bands (that is, a plurality of frequency bands) divided by the unlicensed frequency range, when working in the unlicensed frequency range. Thus, the frequency spectrum utilization rate is increased, and low frequency utilization rate, which is caused by only a part of the RB of the unlicensed frequency range is occupied, however, the other systems still detects that the channel is too busy to transmit data, can be avoided.

The busy/idle states of the uplink channel can be detected by setting a channel monitoring subframe. Thus, corresponding interference avoidance mechanisms can be adopted when the LTE system works in an unlicensed frequency range. Thus, the state of the uplink channel can be detected, and uplink data can be transmitted when the channel is idle. When the channel is detected to be busy, the uplink data is not transmitted. Thus, the LTE system in an unlicensed frequency range is enabled to coexist with the other systems (such as a Wi-Fi system) in the unlicensed frequency range. The LTE system is prevented from generating large interference to other systems having the interference avoidance mechanism, due to the LTE system having no interference avoidance mechanism when the LTE system works in the unlicensed frequency range.

Similar to the device having base station functions, the channel monitoring subframe in the terminal can detect the state of the uplink channel in the following two ways. First, periodical detection, and secondly, detection only when the uplink data needs to be transmitted. In one embodiment, the second way is as follows: the state of the uplink channel is detected when the uplink data needs to be transmitted; if the channel is detected to be busy, a random value N is taken, and continuously detected. N=N−1 is taken if the channel is detected to be idle, otherwise, N is unchanged; and the data is sent until N is reduced to zero.

According to a sixth aspect of the disclosure, a terminal is provided. The terminal includes the channel detection system of an LTE system in an unlicensed frequency range and applicable to the terminal as mentioned in any of the above disclosures.

The disclosure as mentioned above enables the LTE system to divide a wide unlicensed frequency range into a plurality of narrow frequency bands, when the LTE system works in the unlicensed frequency range. Thus, the busy/idle states of the channel in each of the narrow frequency bands can be judged respectively. Therefore, the frequency spectrum utilization rate is improved. By detecting the busy/idle states of the channel, it can be enabled to ensure that the LTE system is prevented from generating large interference to other systems when the LTE system works normally in an unlicensed frequency range.

DETAILED DESCRIPTION

In order to better understand the above objectives, features, and advantages of the present disclosure, the above objectives, features, and advantages of the present disclosure can be more clearly understood, the present disclosure will be further described in detail in the following with reference to the accompanying drawings and the detailed description. It should be noted that, the embodiments of the application and the features in the embodiments can be combined with each other, when there is no conflict.

In the following description, various specific details are set forth in order to provide a thorough understanding of the present disclosure, however, the present disclosure may also be implemented in other ways other than those described herein. Accordingly, the scope of the present disclosure is not limited by the specific embodiments disclosed below.

Figure 2:
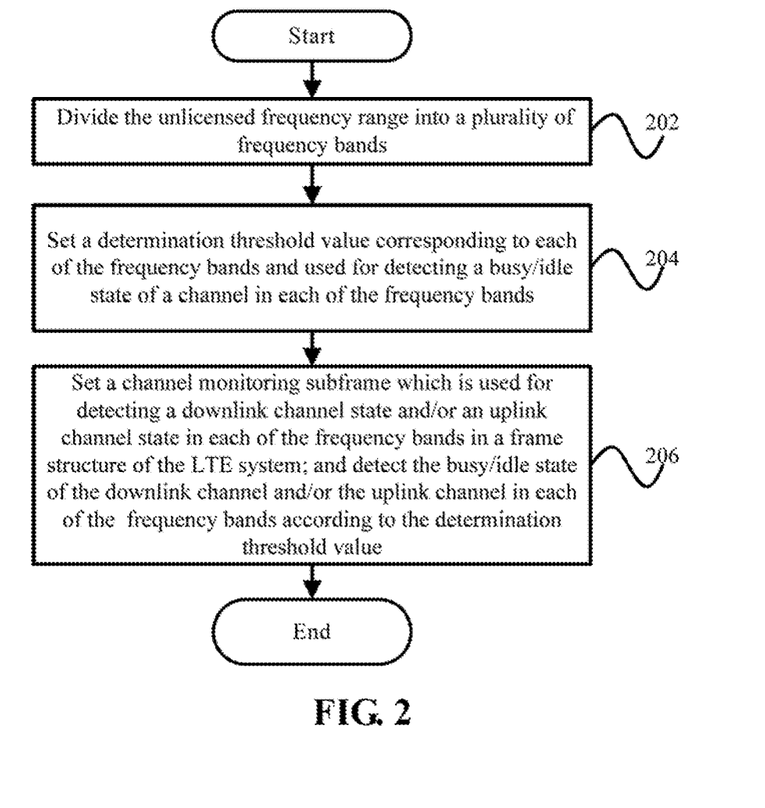
FIG. 2 shows a schematic flow diagram of a channel detection method of an LTE system in an unlicensed frequency range and applicable to a device having base station functions according to an embodiment of the present disclosure.

FIG. 2 shows a schematic flow diagram of a channel detection method of an LTE system in an unlicensed frequency range and applicable to a device having base station functions according to an embodiment of the present disclosure.

As shown in FIG. 2, according to one embodiment of the present disclosure, the channel detection method of an LTE system in an unlicensed frequency range and applicable to a device having base station functions includes: step 202, dividing the unlicensed frequency range into a plurality of frequency bands; step 204, setting a determination threshold value corresponding to each of the frequency bands and used for detecting a busy/idle state of a channel in each of the plurality of frequency bands; step 206, setting a channel monitoring subframe that is used for detecting a downlink channel state and/or an uplink channel state in each of the frequency bands in the frame structure of the LTE system; and detecting a busy/idle states of the downlink channel and/or the uplink channel in each of the frequency bands according to the determination threshold value.

In the above disclosure, by dividing a wide unlicensed frequency range into multiple frequency bands and setting a determination threshold value corresponding to each of the frequency bands for detecting the busy/idle states of the downlink channel and/or the uplink channel in each of the frequency bands according to the determination threshold value, the wide unlicensed frequency range may be divided into a plurality of narrow bands (i.e., multiple frequency bands), when the LTE system works in the unlicensed frequency range. The busy/idle state of the downlink channel and uplink channel in each narrow band can be determined individually. Thus, the frequency spectrum utilization rate is increased, and low frequency utilization rate, which is caused by only a part of the RB of the unlicensed frequency range being occupied, however, the other systems still detects that the channel is too busy to transmit data, can be avoided.

The busy/idle states of the uplink channel and/or the downlink channel can be detected by setting a channel monitoring subframe. Thus, corresponding interference avoidance mechanisms can be adopted when the LTE system works in the unlicensed frequency range. Thus, the state of the uplink channel and/or the downlink channel can be detected, and the data can be transmitted when the channel is idle (that is, the downlink data can be transmitted when the downlink channel is detected to be idle, and a terminal is informed to transmit the uplink data, when the uplink channel is detected to be idle). When the channel is detected to be busy, the data is not transmitted (that is, the downlink data is not transmitted, when the downlink channel is detected to be busy, and the terminal is notified that the uplink data is not transmitted when the uplink channel is detected to be busy). Thus, the LTE system in an unlicensed frequency range can coexist with the other systems (such as a Wi-Fi system) working in the unlicensed frequency range. The LTE system is prevented from generating large interference to other systems having interference avoidance mechanism, since the LTE system has no interference avoidance mechanism when the LTE system works in the unlicensed frequency range.

The channel monitoring subframe can detect the states of the downlink channel and/or the uplink channel in two ways, first, by periodic detecting, and second, by detecting only when the downlink data and/or uplink data need to be transmitted. In one embodiment, the second way is as follows. When the downlink data and/or uplink data need to be transmitted, the states of the downlink channel and/or the uplink channel are detected. If the channel is detected to be busy, taking a random value N, and continuously detecting and then taking N=N−1 if the channel is detected to be idle. Otherwise, N is unchanged; and the data is sent until N is reduced to zero.

In addition, the downlink data includes common interactive data and control signaling. Those skilled in the art will understand that the device having base station functions in the present disclosure can include a macro base station, and a micro-cell base station realized by communication device (such as an intelligent mobile phone and the like), and so on.

In the above disclosure, preferably, the determination threshold value corresponding to each of the frequency bands is set according to a bandwidth of each of the frequency bands and/or a signal type required to be transmitted by each of the frequency bands.

Specifically, for a frequency band that transmits important signal types, such as the frequency band used for transmitting a synchronization signal, to prevent other systems from occupying such frequency band, the determination threshold may be set lower. Other systems can then detect more easily that the channels in such frequency bands are busy. For a wide bandwidth frequency band, a larger determination threshold value can be selected appropriately, and for a narrow frequency band, a smaller determination threshold value can be selected appropriately.

In the above disclosure, preferably, the determination threshold value corresponding to a frequency band used for transmitting a synchronization signal in the plurality of frequency bands is smaller than the determination threshold value corresponding to other frequency bands in the plurality of frequency bands. By setting the determination threshold value corresponding to the frequency band used for transmitting the synchronization signal being smaller than the determination threshold value corresponding to other frequency bands, the other systems can more easily detect that the channels in the frequency bands of transmitting the synchronization signals are busy. Thus, the frequency band used for transmitting the synchronization signal can be avoided being occupied by the other systems, to affect transmitting the synchronization signal of the LTE system.

In the above disclosure, preferably, dividing an unlicensed frequency range into a plurality of frequency bands includes: dividing the unlicensed frequency range into the plurality of frequency bands based on an average, or randomly dividing the unlicensed frequency range into the plurality of frequency bands.

Specifically, for example, for an unlicensed frequency range of 20 MHz for example, four frequency bands of 5 MHz may be divided on an average basis. Otherwise, frequency bands which include 1.4 MHz, 4.3 MHz, and 5 MHz frequencies may be the divisions.

The above disclosure, preferably, further includes: notifying a terminal to measures a channel quality within a specified frequency band of the plurality of frequency bands, and feed back the channel quality within the specified frequency band.

Specifically, when a device having base station functions detects that channels in certain frequency bands are idle, using the channel monitoring subframe, the terminal can be notified to detect and report channel quality information of the idle channels in the frequency bands. An appropriate channel to transmit downlink data is then selected according to the channel quality information reported by the terminal.

In the above disclosure, preferably, detection times and/or a detection period of the channel monitoring subframe used for detecting busy/idle states of the downlink channel and/or the uplink channel in any one of the frequency bands can be the same as or different from the detection times and/or the detection period of the channel monitoring subframe used for detecting busy/idle states of the downlink channel and/or the uplink channel in other frequency bands.

The above disclosure, preferably, further includes: notifying the terminal of a bandwidth of the unlicensed frequency range, a bandwidth of each of the frequency bands, and the determination threshold value corresponding to each of the frequency bands. Thereby, the terminal can detect a busy/idle state of an uplink channel in each of the frequency bands according to the determination threshold value corresponding to each of the frequency bands.

Figure 3:
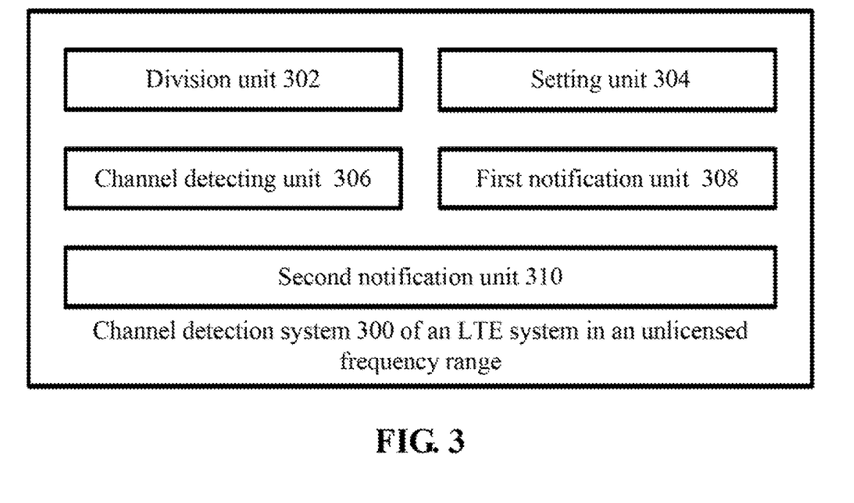
FIG. 3 shows a schematic block diagram of a channel detection system of an LTE system in an unlicensed frequency range and applicable to a device having base station functions according to an embodiment of the present disclosure.
Figure 4:
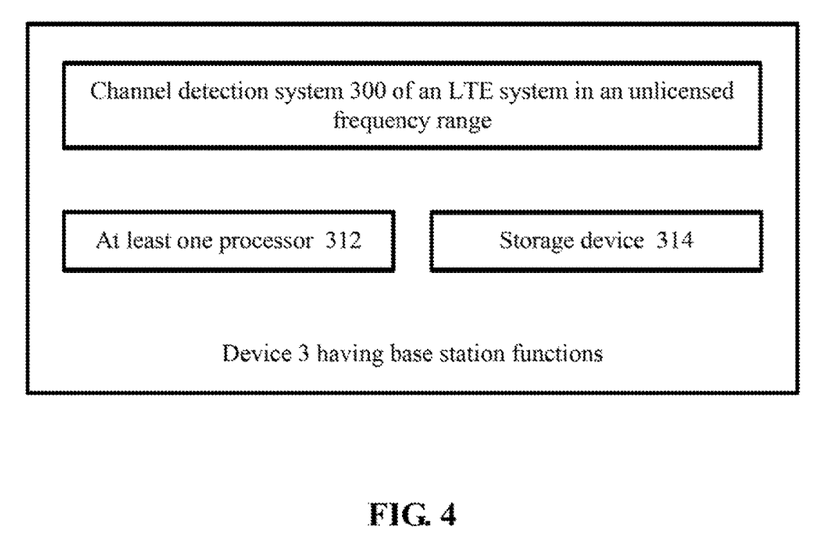
FIG. 4 shows a structure of an exemplary embodiment of a device having base station functions.

FIG. 3 shows a schematic block diagram of a channel detection system of an LTE system in an unlicensed frequency range and applicable to a device having base station functions according to an embodiment of the present disclosure As shown in FIG. 3, according to one embodiment of the present disclosure, the channel detection system 300 of an LTE system in an unlicensed frequency range is included in a device 3 having base station functions (as shown in FIG. 4). The channel detection system 300 of an LTE system in an unlicensed frequency range includes: a division unit 302, which is configured to divide an unlicensed frequency range into a plurality of frequency bands; a setting unit 304, which is configured to set a determination threshold value corresponding to each of the frequency bands and used for detecting a busy/idle state of a channel in each of the plurality of frequency bands; a channel detecting unit 306, which is configured to set a channel monitoring subframe which is used for detecting a downlink channel state and/or an uplink channel state in each of the frequency bands in a frame structure of the LTE system, and detect a busy/idle state of the downlink channel and/or the uplink channel in each of the plurality of frequency bands according to the determination threshold value.

As illustrated in FIG. 4, The device 3 having base station functions can further includes at least one processor 312 and a storage device 314. The division unit 302, the setting unit 304, the channel detecting unit 306, and other units or subunits as described below, include computerized instructions in the form of one or more computer-readable programs that can be stored in the storage device 314, and can be implemented by the at least one processor 312.

The at least one processor 312 is used to execute a plurality of units or subunits in the device 3 having base station functions and other applications, such as an operating system, installed in the device 3 having base station functions. The storage devices 314 store the computerized instructions of a plurality of units or subunits in the device 3 having base station functions, and one or more programs, such as the operating system and applications of the device 3 having base station functions. The storage device 314 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. It may be understood that the device 3 having a base station function may include more or fewer components than described, or have a different configuration of the various components.

In the above disclosure, by dividing a wide unlicensed frequency range into multiple frequency bands and setting a determination threshold value corresponding to each of the frequency bands for detecting the busy/idle states of the downlink channel and/or the uplink channel in each of the frequency bands according to the determination threshold value, the wide unlicensed frequency range may be divided into a plurality of narrow bands (i.e., multiple frequency bands), when the LTE system works in the unlicensed frequency range. The busy/idle state of the downlink channel and uplink channel in each narrow band can be determined individually. Thus, the frequency spectrum utilization rate is increased, and low frequency utilization rate, which is caused by only a part of the RB of the unlicensed frequency range being occupied, however, the other systems still detects that the channel is too busy to transmit data, can be avoided.

The busy/idle states of the uplink channel and/or the downlink channel can be detected by setting a channel monitoring subframe. Thus, corresponding interference avoidance mechanisms can be adopted when the LTE system works in the unlicensed frequency range. Thus, the state of the uplink channel and/or the downlink channel can be detected, and the data can be transmitted when the channel is idle (that is, the downlink data can be transmitted when the downlink channel is detected to be idle, and a terminal is informed to transmit the uplink data, when the uplink channel is detected to be idle). When the channel is detected to be busy, the data is not transmitted (that is, the downlink data is not transmitted, when the downlink channel is detected to be busy, and the terminal is notified that the uplink data is not transmitted when the uplink channel is detected to be busy). Thus, the LTE system in an unlicensed frequency range can coexist with the other systems (such as a Wi-Fi system) working in the unlicensed frequency range. The LTE system is prevented from generating large interference to other systems having interference avoidance mechanism, since the LTE system has no interference avoidance mechanism when the LTE system works in the unlicensed frequency range.

The channel monitoring subframe can detect the states of the downlink channel and/or the uplink channel in two ways, first, by periodic detecting, and second, by detecting only when the downlink data and/or uplink data need to be transmitted. In one embodiment, the second way is as follows. When the downlink data and/or uplink data need to be transmitted, the states of the downlink channel and/or the uplink channel are detected. If the channel is detected to be busy, taking a random value N, and continuously detecting and then taking N=N−1 if the channel is detected to be idle. Otherwise, N is unchanged; and the data is sent until N is reduced to zero.

In addition, the downlink data includes common interactive data and control signaling. Those skilled in the art will understand that the device having base station functions in the present disclosure can include a macro base station, and a micro-cell base station realized by communication device (such as an intelligent mobile phone and the like), and so on.

In the above disclosure, preferably, the setting unit 304 is specifically configured to set the determination threshold value corresponding to each of the frequency bands according to a bandwidth of each of the frequency bands and/or a signal type required to be transmitted by each of the frequency bands.

Specifically, for a frequency band that transmits important signal types, such as the frequency band used for transmitting a synchronization signal, to prevent other systems from occupying such frequency band, the determination threshold may be set lower. Other systems can then detect more easily that the channels in such frequency bands are busy. For a wide bandwidth frequency band, a larger determination threshold value can be selected appropriately, and for a narrow frequency band, a smaller determination threshold value can be selected appropriately.

In the above disclosure, preferably, the determination threshold value corresponding to a frequency band used for transmitting a synchronization signal in the plurality of frequency bands is smaller than the determination threshold value corresponding to other frequency bands in the plurality of frequency bands. By setting the determination threshold value corresponding to the frequency band used for transmitting the synchronization signal being smaller than the determination threshold value corresponding to other frequency bands, the other systems can more easily detect that the channels in the frequency bands of transmitting the synchronization signals are busy. Thus, the frequency band used for transmitting the synchronization signal can be avoided being occupied by the other systems, to affect transmitting the synchronization signal of the LTE system.

In the above disclosure, preferably, the dividing unit 302 is specifically configured to: divide the unlicensed frequency ranges into the plurality of frequency bands based on an average; or randomly divide the unlicensed frequency ranges into the plurality of frequency bands.

Specifically, for example, for an unlicensed frequency range of 20 MHz for example, four frequency bands of 5 MHz may be divided on an average basis. Otherwise, frequency bands which include 1.4 MHz, 4.3 MHz, and 5 MHz frequencies may be the divisions.

In the above disclosure, preferably, the system further includes: a first notification unit 308 configured to notify a terminal to measure channel quality within a specified frequency band of the plurality of frequency bands, and feed back the channel quality within the specified frequency band.

Specifically, when a device having base station functions detects that channels in certain frequency bands are idle, using the channel monitoring subframe, the terminal can be notified to detect and report channel quality information of the idle channels in the frequency bands. An appropriate channel to transmit downlink data is then selected according to the channel quality information reported by the terminal.

In the above disclosure, preferably, detection times and/or a detection period of the channel monitoring subframe used for detecting busy/idle states of the downlink channel and/or the uplink channel in any one of the frequency bands can be the same as or different from the detection times and/or the detection period of the channel monitoring subframe used for detecting busy/idle states of the downlink channel and/or the uplink channel in other frequency bands.

In the above disclosure, preferably, the present disclosure further includes: a second notification unit 310 configured to notify the terminal of a bandwidth of the unlicensed frequency range, a bandwidth of each of the frequency bands, and the determination threshold value corresponding to each of the frequency bands. Thereby, the terminal can detect the busy/idle state of an uplink channel in each of the frequency bands according to the determination threshold value corresponding to each of the frequency bands.

Figure 5:
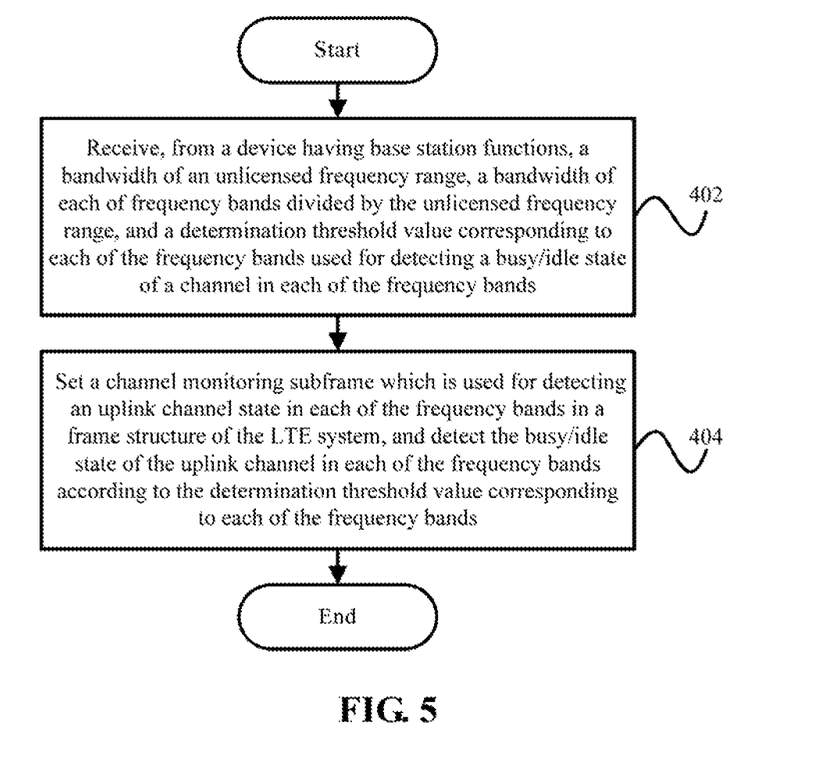
FIG. 5 shows a schematic flow chart of a channel detection method of an LTE system in an unlicensed frequency range and applicable to a terminal according to an embodiment of the present disclosure.

FIG. 5 shows a schematic flow chart of a channel detection method of an LTE system in an unlicensed frequency range and applicable to a terminal according to an embodiment of the present disclosure.

As shown in FIG. 5, according to one embodiment of the present disclosure, the channel detection method of an LTE system in an unlicensed frequency range and applicable to a terminal comprises the following steps: step 402, receiving, from a device having base station functions, a bandwidth of an unlicensed frequency range, a bandwidth of each of frequency bands divided by the unlicensed frequency range, and a determination threshold value corresponding to each of the frequency bands used for detecting a busy/idle state of a channel in each of the plurality of frequency bands; step 404: setting a channel monitoring subframe that is used for detecting an uplink channel state in each of the frequency bands in a frame structure of the LTE system, and detecting the busy/idle states of the uplink channel in each of the plurality of frequency bands according to the determination threshold value corresponding to each of the frequency bands.

In the above disclosure, the unlicensed frequency range provides high bandwidth. By receiving the bandwidth of the unlicensed frequency range, the bandwidth of each of frequency bands divided by the unlicensed frequency range, and the determination threshold value corresponding to each of the frequency bands sent by the device having base station functions, the LTE terminal can determines respectively a busy/idle state of the uplink channel in a plurality of narrow bands (that is, a plurality of frequency bands) divided by the unlicensed frequency range, when working in the unlicensed frequency range. Thus, the frequency spectrum utilization rate is increased, and low frequency utilization rate, which is caused by only a part of the RB of the unlicensed frequency range is occupied, however, the other systems still detects that the channel is too busy to transmit data, can be avoided.

The busy/idle states of the uplink channel can be detected by setting a channel monitoring subframe. Thus, corresponding interference avoidance mechanisms can be adopted when the LTE system works in an unlicensed frequency range. Thus, the state of the uplink channel can be detected, and uplink data can be transmitted when the channel is idle. When the channel is detected to be busy, the uplink data is not transmitted. Thus, the LTE system in an unlicensed frequency range is enabled to coexist with the other systems (such as a Wi-Fi system) in the unlicensed frequency range. The LTE system is prevented from generating large interference to other systems having the interference avoidance mechanism, due to the LTE system having no interference avoidance mechanism when the LTE system works in the unlicensed frequency range.

Similar to the device having base station functions, the channel monitoring subframe in the terminal can detect the state of the uplink channel in the following two ways. First, periodical detection, and secondly, detection only when the uplink data needs to be transmitted. In one embodiment, the second way is as follows: the state of the uplink channel is detected when the uplink data needs to be transmitted; if the channel is detected to be busy, a random value N is taken, and continuously detected. N=N−1 is taken if the channel is detected to be idle, otherwise, N is unchanged; and the data is sent until N is reduced to zero.

Figure 6:
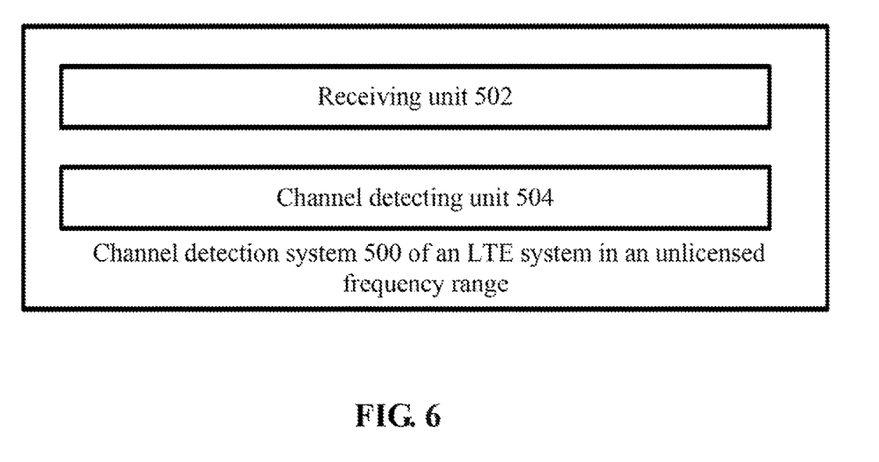
FIG. 6 illustrates a schematic block diagram of a channel detection system of an LTE system in an unlicensed frequency range and applicable to a terminal according to an embodiment of the present disclosure.

FIG. 6 illustrates a schematic block diagram of a channel detection system of an LTE system in an unlicensed frequency range and applicable to a terminal according to an embodiment of the present disclosure.

Figure 7:
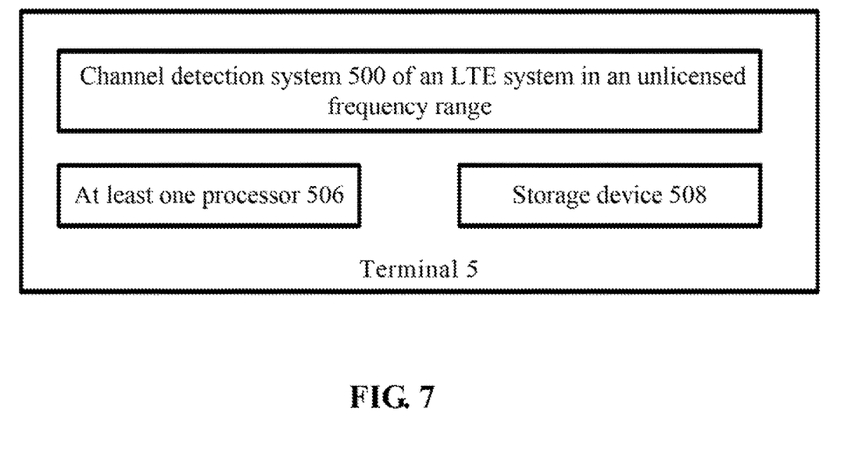
FIG. 7 shows a structure of an exemplary embodiment of a terminal.

As shown in FIG. 6, according to one embodiment of the present disclosure, the channel detection system 500 of an LTE system in an unlicensed frequency range is included in a terminal 5 (as shown in FIG. 7). The channel detection system 500 of an LTE system in an unlicensed frequency range includes: a receiving unit 502, which is configured to receive, from a device having base station functions, a bandwidth of an unlicensed frequency range, a bandwidth of each of frequency bands divided by an unlicensed frequency range, and a determination threshold value corresponding to each of the frequency bands used for detecting a busy/idle state of a channel in each of the plurality of frequency bands; a channel detecting unit 504, which is configured to set a channel monitoring subframe which is used for detecting an uplink channel state in each of the plurality of frequency bands in the frame structure of the LTE system, and detect the busy/idle states of the uplink channel in each of the plurality of frequency bands according to the determination threshold value corresponding to each of the frequency bands.

As illustrated in FIG. 7, The terminal 5 can further includes at least one processor 506 and a storage device 508. The division unit 302, the receiving unit 502, the channel detecting unit 504, and other units or subunits as described below, include computerized instructions in the form of one or more computer-readable programs that can be stored in the storage device 508, and can be implemented by the at least one processor 506.

The at least one processor 506 is used to execute a plurality of units or subunits in the terminal 5 and other applications, such as an operating system, installed in the terminal 5. The storage devices 508 store the computerized instructions of a plurality of units or subunits in the terminal 5, and one or more programs, such as the operating system and applications of the terminal 5. The storage device 508 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. It may be understood that the terminal 5 may include more or fewer components than described, or have a different configuration of the various components.

In the above disclosure, the unlicensed frequency range provides high bandwidth. By receiving the bandwidth of the unlicensed frequency range, the bandwidth of each of frequency bands divided by the unlicensed frequency range, and the determination threshold value corresponding to each of the frequency bands sent by the device having base station functions, the LTE terminal can determines respectively a busy/idle state of the uplink channel in a plurality of narrow bands (that is, a plurality of frequency bands) divided by the unlicensed frequency range, when working in the unlicensed frequency range. Thus, the frequency spectrum utilization rate is increased, and low frequency utilization rate, which is caused by only a part of the RB of the unlicensed frequency range is occupied, however, the other systems still detects that the channel is too busy to transmit data, can be avoided.

The busy/idle states of the uplink channel can be detected by setting a channel monitoring subframe. Thus, corresponding interference avoidance mechanisms can be adopted when the LTE system works in an unlicensed frequency range. Thus, the state of the uplink channel can be detected, and uplink data can be transmitted when the channel is idle. When the channel is detected to be busy, the uplink data is not transmitted. Thus, the LTE system in an unlicensed frequency range is enabled to coexist with the other systems (such as a Wi-Fi system) in the unlicensed frequency range. The LTE system is prevented from generating large interference to other systems having the interference avoidance mechanism, due to the LTE system having no interference avoidance mechanism when the LTE system works in the unlicensed frequency range.

Similar to the device having base station functions, the channel monitoring subframe in the terminal can detect the state of the uplink channel in the following two ways. First, periodical detection, and secondly, detection only when the uplink data needs to be transmitted. In one embodiment, the second way is as follows: the state of the uplink channel is detected when the uplink data needs to be transmitted; if the channel is detected to be busy, a random value N is taken, and continuously detected. N=N−1 is taken if the channel is detected to be idle, otherwise, N is unchanged; and the data is sent until N is reduced to zero.

Specifically, in view of the LBT mechanism in the LAA system, the present disclosure provides an LBT detection scheme based on narrow band or even RB, so as to improve the spectrum utilization rate of the LTE system when the LTE system works in the unlicensed frequency range.

The specific method is as follows:

First: An executing part of the LBT, that is, a base station (the following disclosure takes the base station as an example but those skilled in the art understand that all devices having base station functions can be included) or a terminal, when performing an LBT detection, receives and deals with powers on the entire unlicensed spectrum bandwidth respectively.

Specifically, for example, for a bandwidth of an unlicensed carrier of 20 MHz, granularity of the LBT channel state detection mechanism based on the narrowband may be 10 MHz, 5 MHz, 2.5 MHz, or 1.25 MHz, or even RB.

If a Primary Synchronization Signal (PSS)/a Secondary Synchronization Signal (SSS) is ensured to be sent, and for a physical broadcast channel (PBCH), the minimum bandwidth is 1.4 MHz, that is, there must be 6 RB that are idle, as shown in Table 1.

TABLE 1

| | Channel Bandwidth (MHz) | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Meanwhile, the granularity of the LBT channel state detection mechanism may be uniform, or may be non-uniform. In other words, it is not necessary to divide a carrier of 20 MHz into ten narrow bands of 2 MHz equally, as long as a sum of bandwidths of the divided small carriers is 20 MHz. For example, the division method can be as shown as in table 2. The bandwidths from low frequency to high frequency are 5 MHz, 4.3 MHz, 1.4 MHz, 4.3 MHz and 5 MHz. The low frequencies of 5 MHz and 4.3 MHz use the same determination threshold value (i.e. the threshold value of 1), and the intermediate frequency 1.4 MHz uses a determination threshold value (i.e. the threshold value of 2), and the high frequencies of 5 MHz and 4.3 MHz use the same determination threshold value (i.e. the threshold value of 3). Other division methods may also be used, and each narrow band may correspond to a determination threshold value.

TABLE 2

| | No. | | | | |
|---|---|---|---|---|---|
| | 1 | 2 | 3 | 4 | 5 |
| Location (from low frequency to high frequency) | 5 MHz | 4.3 MHz | 1.4 MHz | 4.3 MHz | 5 MHz |
| Determination threshold value of busy/idle state of channels | | threshold value 1 | Threshold value 2 | | threshold value 3 |

In addition, the threshold values for determining busy/idle state of the channels in each narrow band are different. For example, for the intermediate frequency 1.4 MHz shown in Table 2 for sending the PSS/SSS and PBCH, the threshold value of this narrow band is lower. That is, the channel is determined to be busy when it is detected that ambient signal is not high. The present disclosure prevents the bandwidth of the channel from being interfered with by other systems.

Secondly, the carrier bandwidth of the whole unlicensed frequency range is divided into granularities (namely, the carrier bandwidth is divided into a plurality of narrow bands). When the LBT executing part detects the channel state, each granularity is detected separately. That is, it does not perform power averaging among the different narrow bands. It only performs power averaging or other processing within each narrow band. Specifically, after obtaining a power of each of the narrow bands, a comparison is made against a predetermined threshold value of busy/idle state of channels in each of the narrow bands to determine the busy/idle state of each of the narrow bands. That is, if a power of a narrow band is larger than the threshold value, channels in the narrow band cannot be occupied in the next period of time. If the power is lower than the threshold value, the channels in the narrow band can be occupied in the next period of time.

Thirdly, if the executing part of the LBT is the terminal, the base station must notify the terminal in advance as to the carrier bandwidth of the unlicensed spectrum, the detected granularity of the narrowband LBT, and the threshold value corresponding to each granularity.

Fourth, if the executing part of the LBT confirms that only certain narrow bands are available, feedback as to channel quality indicator (CQI) includes feedback which is only based on the narrow bands available. The base station is also required to notify the terminal about a particular narrow band when signaling about CQI feedback.

Fifth, the repetition period of the LBT for each of the narrow bands can be the same or different.

The LBT detection mechanism is based on the narrow band, so that the unlicensed spectrum can be more dynamically and more flexibly used by different access modes. Thus, the frequency spectrum utilization rate is improved.

The technical solutions of the present disclosure are described above in detail with reference to the accompanying drawings. The present disclosure provides a new channel detection scheme of an LTE system in an unlicensed frequency range, enables the LTE system dividing a wide unlicensed frequency range into a plurality of narrow frequency bands, when the LTE system works in an unlicensed frequency range. Thus, the busy/idle state of the channel in each of the narrow frequency bands can be judged respectively. Therefore, the frequency spectrum utilization rate is improved. By detecting the busy/idle states of the channel, it can be enabled to ensure that the LTE system is prevented from generating large interference to other systems when the LTE system works normally in the unlicensed frequency range.

The above descriptions are only preferred embodiments of the present disclosure, and are not to be used to limit the present disclosure. It will be apparent to those skilled in the art that various modifications and variations can be made in the present disclosure. Any modification or modification made without departing from the spirit and principle of the present disclosure can be made without departing from the spirit and principle of the present disclosure. Equivalent substitutions, improvements, and the like are intended to be included within the scope of the present disclosure.

What is claimed is:

1. A channel detection method of an LTE system in an unlicensed frequency range, the channel detection method being applicable to a device having base station functions, and comprising:
   dividing an unlicensed frequency range into a plurality of frequency bands;
   setting a determination threshold value corresponding to each of the plurality of frequency bands, the determination threshold value being used for detecting a busy/idle state of a channel in each of the plurality of frequency bands;
   setting a channel monitoring subframe that is used for detecting a downlink channel state and an uplink channel state in each of the frequency bands in a frame structure of the LTE system, and detecting busy/idle states of the downlink channel and the uplink channel in each of the plurality of frequency bands according to the determination threshold value, comprising:
   when the downlink channel state is detected to be idle, transmitting the downlink data, and when the uplink channel state is detected to be idle, transmitting the uplink data; and
   when the downlink channel state or the uplink channel state is detected to be busy, comprising:
      taking a random value N; and
      continuously detecting the downlink channel state or the uplink channel state, and taking N=N−1 when the downlink channel state or the uplink channel state is detected to be idle, or unchanging N when the downlink channel state or the uplink channel state is detected to be busy; and
      sending the downlink data or the uplink data when N is reduced to zero.

2. The channel detection method according to claim 1, wherein the determination threshold value corresponding to each of the plurality of frequency bands is set according to a bandwidth of each of the frequency bands and/or a signal type required to be transmitted by each of the frequency bands.

3. The channel detection method according to claim 2, wherein a determination threshold value corresponding to a frequency band used for transmitting a synchronization signal in the plurality of frequency bands is smaller than determination threshold values corresponding to other frequency bands in the plurality of frequency bands.

4. The channel detection method according to claim 1, wherein dividing an unlicensed frequency range into a plurality of frequency bands comprises:
   dividing the unlicensed frequency range into the plurality of frequency bands averagely; or
   dividing the unlicensed frequency range into the plurality of frequency bands randomly.

5. The channel detection method according to claim 1, further comprising:
   notifying a terminal to measure channel quality within a specified frequency band of the plurality of frequency bands and feed back the channel quality within the specified frequency band.

6. The channel detection method according to claim 1, wherein a detection time and/or a detection period of the channel monitoring subframe used for detecting busy/idle states of the downlink channel and/or the uplink channel in any one of the plurality of frequency bands is the same as or different from a detection time and/or a detection period of the channel monitoring subframe used for detecting busy/idle states of the downlink channel and/or the uplink channel in other frequency bands.

7. The channel detection method according to claim 1, further comprising:
   notifying a terminal of a bandwidth of the unlicensed frequency range, a bandwidth of each of the frequency bands, and the determination threshold value corresponding to each of the plurality of frequency bands, so that the terminal detects a busy/idle state of an uplink channel in each of the plurality of frequency bands according to the determination threshold value corresponding to each of the plurality of frequency bands.

8. The channel detection method according to claim 1, wherein the channel monitoring subframe detects the downlink channel state and the uplink channel state periodically, or detects the downlink channel state when the downlink data needs to be transmitted or detects the uplink channel state when the uplink data needs to be transmitted.

9. A channel detection method of an LTE system in an unlicensed frequency range, the channel detection method being applicable to a terminal, and comprising:
   receiving, from a device having base station functions, a bandwidth of an unlicensed frequency range, a bandwidth of each of frequency bands divided by the unlicensed frequency range, and a determination threshold value corresponding to each of the frequency bands, the determination threshold value used for detecting a busy/idle state of a channel in each of the frequency bands;
   setting a channel monitoring subframe that is used for detecting an uplink channel state in each of the frequency bands in a frame structure of the LTE system, and detecting the busy/idle state of the uplink channel in each of the frequency bands according to the determination threshold value corresponding to each of the frequency bands, comprising:
   when the uplink channel state is detected to be idle, transmitting the uplink data; and
   when the uplink channel state is detected to be busy, comprising:
      taking a random value N; and
      continuously detecting the uplink channel state, and taking N=N−1 when the uplink channel state is detected to be idle, or unchanging N when the uplink channel state is detected to be busy; and
      sending the uplink data when N is reduced to zero.

10. The channel detection method according to claim 9, wherein the uplink channel state is detected periodically or only when the uplink data needs to be transmitted.

11. A device having base station functions comprising:
    at least one processor; and a storage device storing a plurality of instructions, which when executed by the processor, causes the at least one processor to:
divide an unlicensed frequency range into a plurality of frequency bands;
set a determination threshold value corresponding to each of the plurality of frequency bands, the determination threshold value being used for detecting a busy/idle state of a channel in each of the plurality of frequency bands;
set a channel monitoring subframe that is used for detecting a downlink channel state and an uplink channel state in each of the frequency bands in a frame structure of the LTE system, and detect the busy/idle states of the downlink channel and the uplink channel in each of the frequency bands according to the determination threshold value, comprising:
when the downlink channel state is detected to be idle, transmitting the downlink data, and when the uplink channel state is detected to be idle, transmitting the uplink data; and
when the downlink channel state or the uplink channel state is detected to be busy, comprising:
taking a random value N; and
continuously detecting the downlink channel state or the uplink channel state, and taking N=N−1 when the downlink channel state or the uplink channel state is detected to be idle, or unchanging N when the downlink channel state or the uplink channel state is detected to be busy; and
sending the downlink data or the uplink data when N is reduced to zero.

12. The device having base station functions according to claim 11, wherein the plurality of instructions when executed by the processor further causes the at least one processor to:
set the determination threshold value corresponding to each of the plurality of frequency bands according to a bandwidth of each of the frequency bands and/or a signal type required to be transmitted by each of the frequency bands.

13. The device having base station functions as claimed in claim 12, wherein a determination threshold value corresponding to a frequency band used for transmitting a synchronization signal in the plurality of frequency bands is smaller than determination threshold values corresponding to other frequency bands in the plurality of frequency bands.

14. The device having base station functions according to claim 11, wherein the plurality of instructions when executed by the processor further causes the at least one processor to:
divide the unlicensed frequency ranges into the plurality of frequency bands averagely; or
divide the unlicensed frequency ranges into the plurality of frequency bands randomly.

15. The device having base station functions according to claim 11, wherein the plurality of instructions when executed by the processor further causes the at least one processor to:
notify a terminal to measure channel quality within a specified frequency band of the plurality of frequency bands, and feed back the channel quality within the specified frequency band.

16. The device having base station functions according to claim 11, wherein a detection time and/or a detection period of the channel monitoring subframe is used for detecting states of the downlink channel and/or the uplink channel in any one of the plurality of frequency bands is the same as or different from a detection time and/or a detection period of the channel monitoring subframe used for detecting the states of the downlink channel and/or the uplink channel in other frequency bands.

17. The device having base station functions according to claim 11, wherein the plurality of instructions when executed by the processor further causes the at least one processor to:
notify a terminal of a bandwidth of the unlicensed frequency range, a bandwidth of each of the frequency bands, and the determination threshold value corresponding to each of the plurality of frequency bands, so that the terminal detects the busy/idle state of an uplink channel in each of the plurality of frequency bands according to the determination threshold value corresponding to each of the plurality of frequency bands.

18. The device having base station functions according to claim 11, wherein the channel monitoring subframe detects the downlink channel state and the uplink channel state periodically, or detects the downlink channel state when the downlink data needs to be transmitted or detects the uplink channel state when the uplink data needs to be transmitted.

19. A terminal, comprising:
at least one processor; and
a storage device storing a plurality of instructions, which when executed by the processor, causes the at least one processor to:
receive, from a device having base station functions, a bandwidth of an unlicensed frequency range, a bandwidth of each of frequency bands divided by an unlicensed frequency range, and a determination threshold value corresponding to each of the frequency bands used for detecting a busy/idle state of a channel in each of the plurality of frequency bands; and
set a channel monitoring subframe that is used for detecting an uplink channel state in each of the frequency bands in the frame structure of the LTE system, and detect the busy/idle state of the uplink channel in each of the frequency bands according to the determination threshold value corresponding to each of the frequency bands, comprising:
when the uplink channel state is detected to be idle, transmitting the uplink data; and
when the uplink channel state is detected to be busy, comprising:
taking a random value N; and
continuously detecting the uplink channel state, and taking N=N−1 when the uplink channel state is detected to be idle, or unchanging N when the uplink channel state is detected to be busy; and
sending the uplink data when N is reduced to zero.

20. The terminal according to claim 19, wherein the uplink channel state is detected periodically or only when the uplink data needs to be transmitted.

* * * * *

UNITED STATES PATENT AND TRADEMARK OFFICE
CERTIFICATE OF CORRECTION

PATENT NO. : 10,375,579 B2
APPLICATION NO. : 15/444338
DATED : August 6, 2019
INVENTOR(S) : Li et al.

It is certified that error appears in the above-identified patent and that said Letters Patent is hereby corrected as shown below:

In the Claims
In Claim 9, at Column 20, Line 39, delete "by" and insert therefor -- from --.
In Claim 9, at Column 20, Line 53, delete "the" before uplink data.
In Claim 9, at Column 20, Line 55, delete "comprising:".
In Claim 19, at Column 22, Line 35, delete "by" and insert therefor -- from --.
In Claim 19, at Column 22, Line 48, delete "the" before uplink data.
In Claim 19, at Column 22, Line 50, delete "comprising:".

Signed and Sealed this
Sixth Day of August, 2024

Katherine Kelly Vidal
*Director of the United States Patent and Trademark Office*